UNITED STATES PATENT OFFICE.

FRANK LEO CAVAGNARO, OF WINSTED, CONNECTICUT.

COMPOSITION OF MATTER FOR BELT-DRESSINGS.

1,023,992. Specification of Letters Patent. Patented Apr. 23, 1912.

No Drawing. Application filed May 24, 1910. Serial No. 563,016.

*To all whom it may concern:*

Be it known that I, FRANK LEO CAVAGNARO, a citizen of the United States, residing at Winsted, in the county of Litchfield and State of Connecticut, have invented certain new and useful Improvements in Composition of Matter for Belt-Dressings; and I do hereby declare the following to be a full, clear, and exact description of the invention, such as will enable others skilled in the art to which it appertains to make and use the same.

The invention has reference, generally, to improvements in belt-dressings; and, the present invention relates, more particularly, to a novel composition of matter which is to be used as a dressing for machine-belts. The said composition of matter consists of the following ingredients, combined in the proportions stated, viz:—animal oil, 3 quarts; cylinder oil, 1 quart; beef tallow, 1 quart; slaked lime, 11 pounds. The same composition of matter set forth in pounds is as follows:—animal oil, 6 pounds; cylinder oil, 2 pounds; beef tallow, 2 pounds; slaked lime, 11 pounds.

By the term animal oil is meant such an oil as is commonly known as whale oil, or neat's foot oil, obtained by boiling horses' feet with neats' feet and sheep's feet. By cylinder oil is understood the usual petroleum oils, such as are employed in lubricating the cylinders of engines.

In producing the above stated composition of matter the following process or steps are employed. The tallow called for in the above formula is first boiled, adding thereto the animal oil in the quantity stated, and then adding the cylinder oil to the said mixture also in the quantity stated in the above formula, the said oils being added while the tallow is still hot. To this combination or mixture of the tallow, animal oil and cylinder oil is then added the slaked lime in the quantity, by weight, stated in the formula, whereupon the whole matter is again boiled sufficiently long so as to produce a smooth and perfect mixture.

Having thus described my present invention, what I claim is:

1. The herein described composition of matter, consisting of animal oil, cylinder oil, tallow, and slaked lime, substantially as described and for the purposes specified.

2. The herein described composition of matter, consisting of animal oil, three parts, cylinder oil, one part, beef tallow, one part, and slaked lime, eleven parts, substantially as described.

In testimony that I claim the invention set forth above I have hereunto set my hand this seventeenth day of May, 1910.

FRANK LEO CAVAGNARO.

Witnesses:
E. R. UNDERWOOD,
E. N. MATTHIAS.

Copies of this patent may be obtained for five cents each, by addressing the "Commissioner of Patents, Washington, D. C."